United States Patent
Davis et al.

(10) Patent No.: US 10,124,623 B2
(45) Date of Patent: Nov. 13, 2018

(54) FLEXIBLE TRANSLUCENT COLOR MATCHING APPARATUS

(75) Inventors: Benjamin N. Davis, Providence, UT (US); David H. Murphy, Providence, UT (US); Bryan R. Miyasaki, Elwood, UT (US); Vincent R. Spinning, Logan, UT (US)

(73) Assignee: Harris Research, Inc, Nashville, TN (US)

( * ) Notice: Subject to any disclaimer, the term of this patent is extended or adjusted under 35 U.S.C. 154(b) by 0 days.

(21) Appl. No.: 13/238,979

(22) Filed: Sep. 21, 2011

(65) Prior Publication Data

US 2012/0067503 A1 Mar. 22, 2012

Related U.S. Application Data

(60) Provisional application No. 61/385,029, filed on Sep. 21, 2010.

(51) Int. Cl.
*B44D 5/00* (2006.01)
*B44D 3/00* (2006.01)
(Continued)

(52) U.S. Cl.
CPC ............... *B44D 3/003* (2013.01); *B44C 1/10* (2013.01); *G01J 3/52* (2013.01); *G09F 5/04* (2013.01);
(Continued)

(58) Field of Classification Search
CPC ............. B44D 3/003; B44D 5/00; B44D 7/00
(Continued)

(56) References Cited

U.S. PATENT DOCUMENTS

| 935,474 A | 9/1909 | Eckart |
| 1,032,156 A | 7/1912 | Pearson |

(Continued)

FOREIGN PATENT DOCUMENTS

| FR | 2159617 A5 | 6/1973 |
| GB | 2222478 A | 3/1990 |

(Continued)

OTHER PUBLICATIONS

PCT/US2011/052633 International Search Report and Written Opinion, dated May 2, 2012.

*Primary Examiner* — Sarang Afzali
*Assistant Examiner* — Darrell C Ford
(74) *Attorney, Agent, or Firm* — Kunzler, PC

(57) ABSTRACT

An apparatus, system, and method are disclosed for selecting a finish for applying to an item. The apparatus includes a flexible translucent sheet, and at least one semi-translucent color applied to the translucent sheet such that a surface to which the translucent sheet is attached is visible through the translucent sheet and the semi-translucent color. The system includes the apparatus and a protective laminate surface covering the at least one semi-translucent color. The method includes providing a plurality of translucent sheets each having at least one semi-translucent color, examining an item to determine the type of finish of the item, selecting a flexible translucent sheet according to the finish of the item, conforming and affixing the selected translucent sheet to the surface of the item, and viewing the surface of the item through the selected translucent sheet.

2 Claims, 8 Drawing Sheets

(51) Int. Cl.
*B44C 1/10* (2006.01)
*G01J 3/52* (2006.01)
*G09F 5/04* (2006.01)
*B32B 5/00* (2006.01)

(52) U.S. Cl.
CPC . *G09F 2005/043* (2013.01); *Y10T 428/24066* (2015.01)

(58) Field of Classification Search
USPC ............. 382/162; 427/8; 428/106; 156/64; 434/72, 75, 79, 80, 365, 367; 29/458, 29/428
See application file for complete search history.

(56) References Cited

U.S. PATENT DOCUMENTS

| | | | |
|---|---|---|---|
| 2,481,672 A * | 9/1949 | Kanaske | 434/79 |
| 2,890,531 A * | 6/1959 | Gracier | 434/75 |
| 3,008,247 A * | 11/1961 | Gaumond | 434/367 |
| 3,088,226 A | 5/1963 | Watterson et al. | |
| 3,135,058 A * | 6/1964 | Haas et al. | 434/75 |
| 3,715,823 A * | 2/1973 | Brossard | A47G 1/12 40/738 |
| 4,078,492 A * | 3/1978 | Levy et al. | 29/428 |
| 4,457,718 A | 7/1984 | Lerner | |
| 4,458,435 A | 7/1984 | Ackerman | |
| 4,940,622 A * | 7/1990 | Leavitt et al. | 428/137 |
| 5,358,094 A * | 10/1994 | Molinaro et al. | 198/502.1 |
| 5,368,485 A * | 11/1994 | Phillips | 434/75 |
| 5,628,949 A * | 5/1997 | Bordener | 264/161 |
| 5,807,110 A | 9/1998 | Hytry et al. | |
| 5,949,432 A | 9/1999 | Gough et al. | |
| 6,358,598 B1 * | 3/2002 | Hicks | 428/203 |
| 6,416,612 B1 * | 7/2002 | Lerner et al. | 156/277 |
| 6,582,801 B1 * | 6/2003 | Schmitt | 428/209 |
| 6,749,932 B1 * | 6/2004 | Gould | 428/327 |
| 6,755,646 B2 * | 6/2004 | Zun | 433/26 |
| 6,761,794 B2 * | 7/2004 | Mott et al. | 156/277 |
| 6,790,042 B2 * | 9/2004 | Worth | 434/75 |
| 6,829,850 B2 | 12/2004 | Goode | |
| 6,976,328 B1 | 12/2005 | Goller | |
| 6,995,843 B2 * | 2/2006 | Janssen et al. | 356/421 |
| 7,005,171 B2 * | 2/2006 | Lerner et al. | 428/41.8 |
| 7,014,466 B2 | 3/2006 | Cojic et al. | |
| 7,116,420 B2 * | 10/2006 | Skierski et al. | 356/408 |
| 7,448,503 B2 * | 11/2008 | Magee et al. | 211/49.1 |
| 7,623,241 B2 * | 11/2009 | Brini et al. | 356/408 |
| 7,661,959 B2 * | 2/2010 | Green et al. | 434/75 |
| 7,756,328 B2 * | 7/2010 | Komiya et al. | 382/164 |
| 7,764,831 B1 * | 7/2010 | Pick et al. | 382/162 |
| RE41,922 E * | 11/2010 | Gough | G06F 3/0481 345/629 |
| 7,914,285 B2 * | 3/2011 | Boney | 434/72 |
| 7,953,274 B2 * | 5/2011 | Sara et al. | 382/165 |
| 7,972,671 B2 * | 7/2011 | Riordan et al. | 428/40.1 |
| 7,995,838 B2 * | 8/2011 | Komiya et al. | 382/162 |
| 8,108,169 B2 * | 1/2012 | Martin | 702/84 |
| 8,241,039 B2 * | 8/2012 | Bender et al. | 434/72 |
| 8,244,032 B2 * | 8/2012 | Sara et al. | 382/165 |
| 8,376,748 B2 * | 2/2013 | Boney | 434/98 |
| 8,646,326 B2 * | 2/2014 | Peltz et al. | 73/150 R |
| 2002/0007909 A1 * | 1/2002 | Mott et al. | 156/307.3 |
| 2002/0014297 A1 * | 2/2002 | Mott et al. | 156/78 |
| 2002/0039632 A1 * | 4/2002 | Hicks | 428/38 |
| 2002/0085960 A1 * | 7/2002 | Henninger et al. | 422/103 |
| 2002/0197586 A1 * | 12/2002 | Worth | 434/75 |
| 2003/0108724 A1 * | 6/2003 | Hicks | 428/195 |
| 2003/0124481 A1 * | 7/2003 | Zun | 433/26 |
| 2003/0151611 A1 * | 8/2003 | Turpin et al. | 345/589 |
| 2003/0156752 A1 * | 8/2003 | Turpin et al. | 382/162 |
| 2004/0003888 A1 * | 1/2004 | Mott et al. | 156/269 |
| 2004/0131756 A1 * | 7/2004 | Skierski et al. | 427/8 |
| 2004/0224278 A1 * | 11/2004 | Zun | 433/26 |
| 2005/0074583 A1 * | 4/2005 | Gratopp et al. | 428/174 |
| 2005/0238855 A1 * | 10/2005 | Gerace | 428/195.1 |
| 2006/0121231 A1 * | 6/2006 | Lerner et al. | 428/40.1 |
| 2006/0204701 A1 | 9/2006 | Eichenberger | |
| 2006/0210153 A1 * | 9/2006 | Sara et al. | 382/165 |
| 2006/0250668 A1 * | 11/2006 | Komiya et al. | 358/504 |
| 2006/0274410 A1 * | 12/2006 | Gerace | 359/435 |
| 2007/0044356 A1 * | 3/2007 | Riordan et al. | 40/544 |
| 2007/0122612 A1 * | 5/2007 | Young et al. | 428/343 |
| 2008/0015791 A1 * | 1/2008 | Brini et al. | 702/23 |
| 2008/0018129 A1 * | 1/2008 | Pelletier | B60J 11/06 296/1.08 |
| 2008/0221993 A1 * | 9/2008 | Gleeson et al. | 705/14 |
| 2008/0249894 A1 * | 10/2008 | Madel | 705/27 |
| 2008/0313944 A1 * | 12/2008 | Lear | G09F 3/10 40/661.11 |
| 2009/0202132 A1 * | 8/2009 | Kimmitt et al. | 382/141 |
| 2009/0248338 A1 * | 10/2009 | Martin | 702/81 |
| 2010/0018087 A1 * | 1/2010 | Erickson et al. | 40/1 |
| 2010/0055660 A1 * | 3/2010 | Hicks | 434/365 |
| 2010/0232688 A1 * | 9/2010 | Komiya et al. | 382/162 |
| 2010/0285289 A1 * | 11/2010 | Nollet et al. | 428/211.1 |
| 2010/0330336 A1 * | 12/2010 | Guillot et al. | 428/156 |
| 2011/0138714 A1 * | 6/2011 | Van Seters | 52/204.5 |
| 2011/0210978 A1 * | 9/2011 | Sara et al. | 345/592 |
| 2011/0243628 A1 * | 10/2011 | MacLean | B32B 3/14 400/76 |
| 2011/0271570 A1 * | 11/2011 | Schlasinger | G09F 7/04 40/600 |
| 2012/0031540 A1 * | 2/2012 | Peltz et al. | 156/64 |
| 2013/0127892 A1 * | 5/2013 | Moore et al. | 345/582 |
| 2014/0113256 A1 * | 4/2014 | Peltz et al. | 434/98 |
| 2015/0064660 A1 * | 3/2015 | Bender et al. | 434/72 |

FOREIGN PATENT DOCUMENTS

| | | |
|---|---|---|
| GB | 2243341 A | 10/1991 |
| JP | 09-328562 | 12/1997 |
| JP | 2008183751 | 8/2008 |
| KR | 10-0297492 | 8/2001 |
| KR | 1020060125653 | 12/2006 |
| KR | 20-0440526 | 6/2008 |

* cited by examiner

FLEXIBLE TRANSLUCENT COLOR MATCHING APPARATUS

CROSS-REFERENCES TO RELATED APPLICATIONS

This application claims the benefit of, U.S. Provisional Patent Application No. 61/385,029 entitled "FLEXIBLE TRANSLUCENT COLOR MATCHING APPARATUS" and filed on Sep. 21, 2010 for Benjamin N. Davis et al., which is incorporated herein by reference.

TECHNICAL FIELD

This disclosure relates to color matching devices and more particularly relates to translucent flexible sheets having color samples.

BACKGROUND

Wood products are used extensively in both commercial and residential buildings. Wood products are used to make furniture, decorations, and floor coverings. Wood can be finished using wood stains and varnishes or paints. Generally, wood finishing protects and embellishes the surface of the wood product, and is achieved by filling imperfections, sanding, and painting and/or staining. Due to the nature of wood, often times it is necessary to refinish the wood product by reapplying stain.

Unlike paint, getting a good stain match while refinishing, or selecting the right color of stain in the first place, is problematic with stains. Stain is transparent, for the most part, and therefore any variation in the wood can cause variation in the finish. The process, generally, includes selecting a base stain and then adding stain colorants to match the wood product by staining a test wood product, tweaking the color combination, and staining the test wood product again until a match is achieved.

Unfortunately, this process commonly takes place away from the location of the wood product, for example, at the paint store, or in a woodshop. Therefore, other considerations, like lighting, that factor into the stain matching process, may result in an undesirable stain match.

SUMMARY

From the foregoing discussion, it should be apparent that a need exists for an apparatus, system, and method for a flexible and translucent color matching apparatus. The present disclosure has been developed in response to the present state of the art, and in particular, in response to the problems and needs in the art that have not yet been fully solved by currently available color matching apparatuses. Accordingly, the present disclosure has been developed to provide an apparatus, system, and method that overcome many or all of the above-discussed shortcomings in the art.

An apparatus is provided that includes a flexible translucent sheet, and at least one semi-translucent color pattern applied to the translucent sheet such that a surface to which the translucent sheet is attached is visible through the translucent sheet and the semi-translucent color pattern. The flexible translucent sheet may be formed of a static cling vinyl film having a thickness in the range of between about 0.04 and 0.12 mm. The color pattern further, in one embodiment, is a pattern representative of wood grain and a color representative of wood.

The apparatus may also include a protective laminate surface covering the color pattern. The protective laminate surface may be formed of a coating of static cling vinyl film. The apparatus may also include multiple color patterns, where each of the color patterns represents a unique color/grain/finish combination. The color patterns may be arranged in a grid pattern on the flexible translucent sheet, with boundaries separating adjacent color patterns. Alternatively, the color patterns may be arranged on the flexible translucent sheet so that the color patterns gradually blend from one color pattern to an adjacent color pattern without a distinctive boundary between adjacent color patterns. Furthermore, each color pattern may represent one of a gloss, semi-gloss, satin, or matte finish.

A system of the present disclosure is also presented and includes a flexible translucent sheet, at least one semi-translucent color pattern applied to the translucent sheet such that a surface to which the translucent sheet is attached is visible through the translucent sheet and the semi-translucent color, and a protective laminate surface covering the at least one semi-translucent color pattern.

A method of the present disclosure is also presented. The method in the disclosed embodiments substantially includes the steps necessary to carry out the functions presented above with respect to the operation of the described apparatus and system. In one embodiment, the method includes providing a plurality of translucent sheets each having at least one semi-translucent color pattern, examining an item to determine the type of finish of the item, selecting a flexible translucent sheet according to the finish of the item, conforming and affixing the selected translucent sheet to the surface of the item, and viewing the surface of the item through the selected translucent sheet.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided to give a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Figure 1:
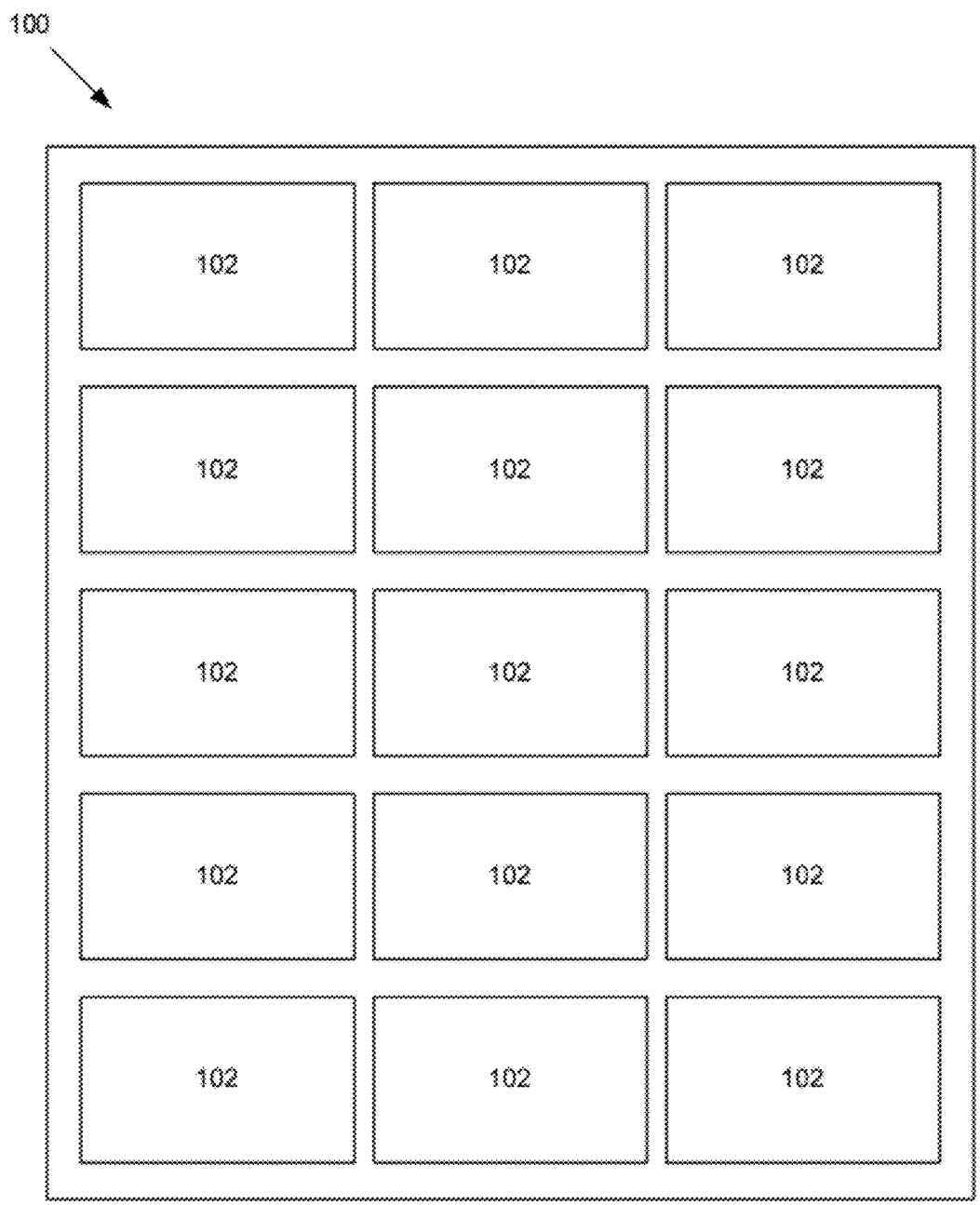
FIG. 1 is a schematic block diagram illustrating one embodiment of a flexible translucent color matching apparatus.

FIG. 1 is a schematic block diagram illustrating one embodiment of a flexible translucent color matching apparatus 100 (hereinafter "sheet"). The sheet 100 is formed of a translucent, or see-through, flexible and supple material. As used herein, the term "translucent" means substantially optically transparent. Furthermore, as used herein, the term "semi-translucent" means having an opacity between translucent and opaque.

One example of a flexible and supple material suitable for use in the present disclosure is a clear static cling vinyl film. Static cling vinyl is a special formulation of polyvinyl chloride (PVC) to which a large amount of plasticizer has been added. The large amount of plasticizer results in a pliable or supple vinyl film that adheres to smooth surfaces without the need for an adhesive. The static cling vinyl film is used because the static cling vinyl film is capable of temporarily affixing to smooth surfaces without the need for an adhesive, and the pliable and supple nature of the vinyl allows the sheet 100 to conform to the profile of the item to be color matched. Alternatively, a flexible and supple film having a positional or reusable adhesive may be used instead of a static cling vinyl film.

In one embodiment, the vinyl film has a thickness in the range of between about 0.04 and 0.12 mm. In a further embodiment, the vinyl film has a thickness of about 0.08 mm. The height and width of the sheet 100 is determined according to the item that will be color matched and the desired number of color patterns included on the sheet 100. For example, the sheet 100 may have the dimensions of common letter paper. Alternatively, the sheet 100 may be scaled up or down depending on the item.

The sheet 100 includes a plurality of color patterns 102. As used herein, the term "color pattern" refers to a representative portion or sample that is indicative of how a stain or paint would appear on an item such as a cabinet. The color pattern may depict a color and a wood grain, thereby illustrating a wood stained finish, or alternatively, the color pattern may depict a solid color.

In the depicted embodiment, the sheet 100 has 15 color patterns 102; alternatively, the sheet 100 may include any number of color patterns 102. The color patterns 102, in one example, are printed on the sheet 100 using an inkjet printer. The color patterns 102 are semi-translucent so that a person may view the surface that is under the color pattern 102. Alternatively, other methods of applying the color patterns 102 to the sheet 100 include, but are not limited to, lithographic printing, screen printing, flexographic printing, and thermal transfer. In other words, any manner of color application that results in at least a semi-transparent color pattern is suitable for use with the present disclosure.

In a further embodiment, the sheet 100 may include a thin protective laminate film or layer to protect the color patterns 102. The thin protective laminate film or layer helps prevent damage to the color patterns from contact with items that might rub or scratch off the color 102. Additionally, the thin protective laminate film or layer functions to prevent fading of the color patterns 102, for example, fading caused by exposure to UV rays.

Figure 2:
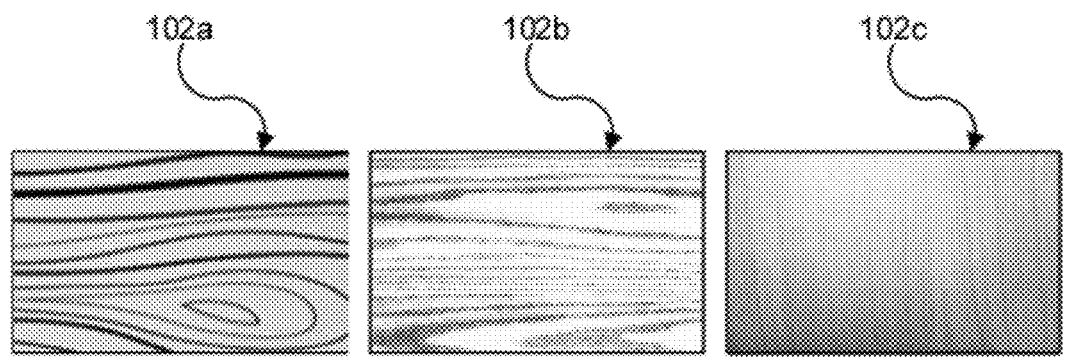
FIG. 2 is an illustration of color patterns having different translucent finishes.

FIG. 2 is an illustration of color patterns 102a, 102b, 102c having different translucent finishes. The color patterns 102a, 102b, 102c of FIG. 2 are similar to the color patterns 102 described above with reference to FIG. 1. In other words, although the sheet 100 is not depicted here in FIG. 2, the color patterns 102a, 102b, 102c function in a similar manner as described above in that the semi-translucent quality of the color patterns 102a, 102b, 102c allows a user to visualize what an item might look like with a particular finish.

The color patterns 102a, 102b, 102c, in one embodiment, have different colors and wood grain patterns that are representative of different stains, paints, of finishes that a person might select. This allows a person to visualize what an item, such as a piece of furniture, would look like with a selected finish. Although the depicted embodiment illustrates semi-translucent finishes having a wood grain, the color patterns 102a, 102b, 102c might alternatively be provided without a wood grain. As such, a person is able to visualize what an item such as a wall, floor, or piece of furniture might look like without a wood grain finish.

Figure 3:
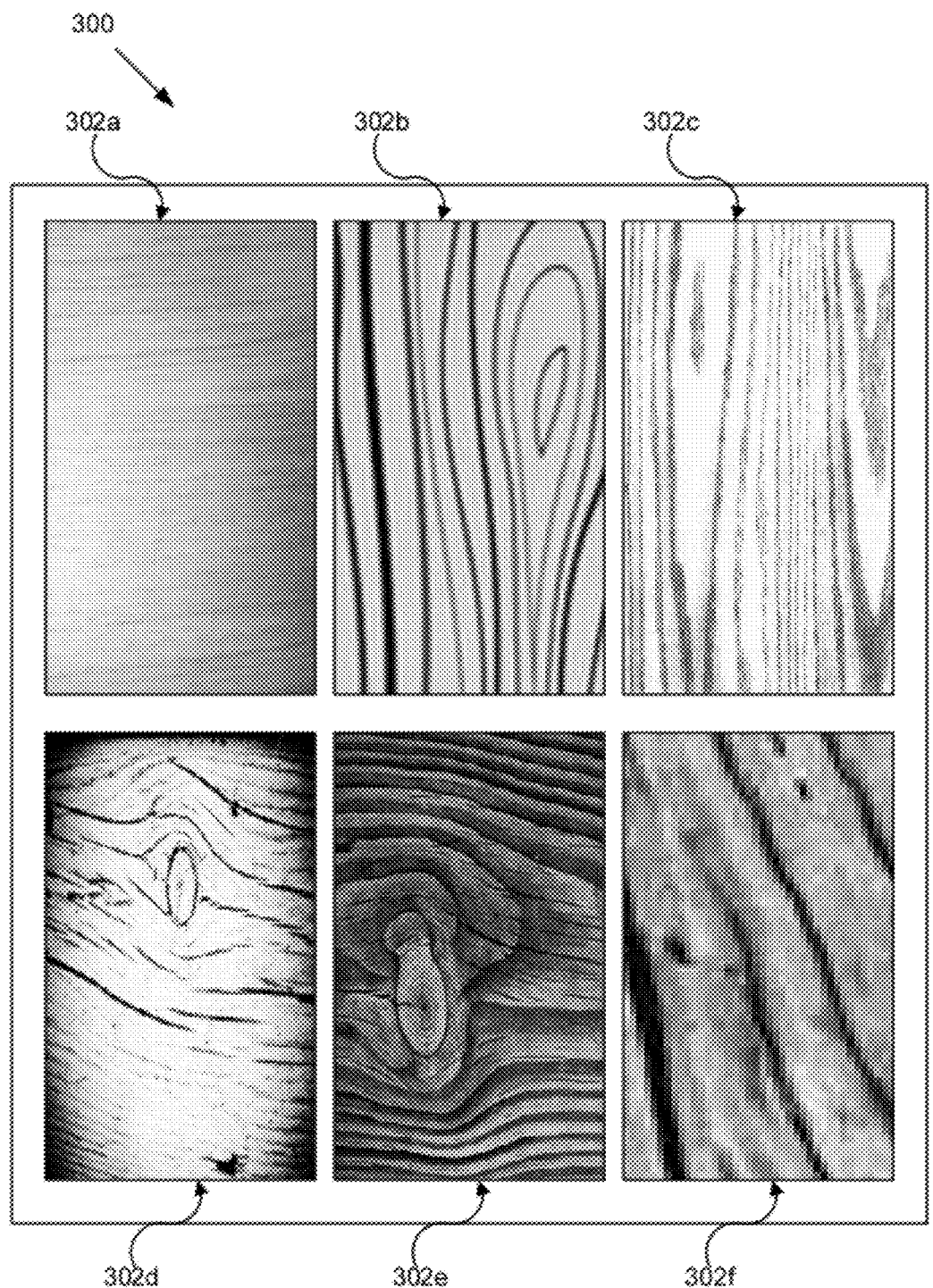
FIG. 3 is a block diagram illustrating another embodiment of a sheet.

FIG. 3 is a block diagram illustrating another embodiment of a sheet 300. The sheet 300, similar to the sheet 100 of FIG. 1, includes a set of color patterns 302a, 302b, 302c, 302d, 302e, 302f (referred to collectively as "color patterns 302"). The color patterns 302, in one example, are printed as rectangular-shaped color patterns and arranged in a grid pattern as illustrated. The grid pattern may be adjusted with differing numbers of rows and columns accordingly. Alternatively, the color patterns 302 may be printed as hexagon-shaped color patterns and arranged in a honey-comb configuration, for example. Any number of color patterns 302 may be organized on the sheet 100. In a further embodiment, the color patterns 302 are not distinct color patterns 302 as illustrated, rather the color patterns 302 gradually blend from one sample to another. In this further embodiment, a person is able to select a combination of the gradually blended color patterns 302.

Figure 4:
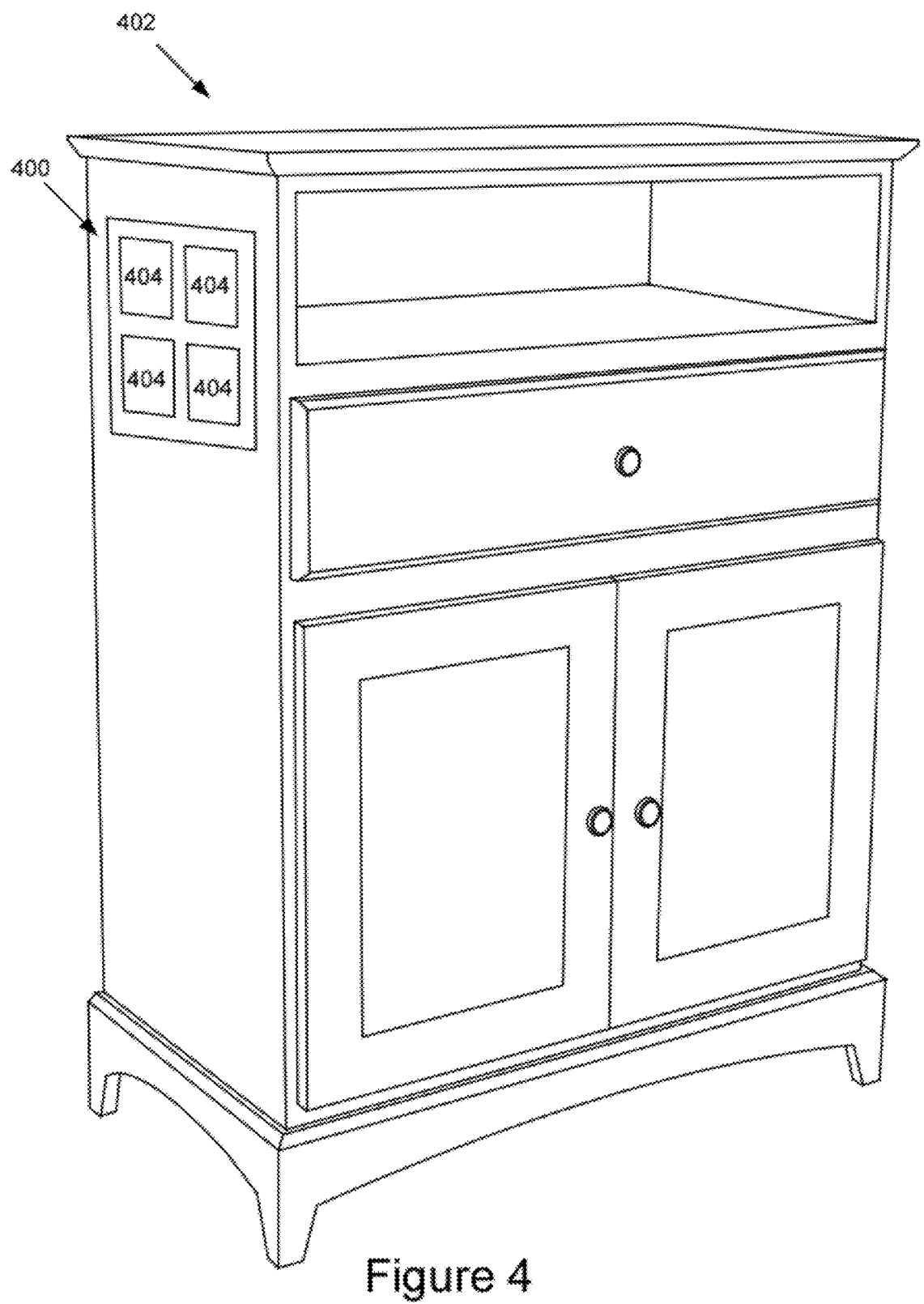
FIG. 4 is a perspective view diagram illustrating one embodiment of a sheet attached to an item.

FIG. 4 is a perspective view diagram illustrating one embodiment of a sheet 400 attached to an item 402. As described above, the sheet 400, similar to the sheet 100 of FIG. 1, attaches to smooth surfaces such as the surface of the item 402. In the depicted embodiment, the item 402 is a piece of furniture, however the sheet 400 is also capable of attaching to other items besides furniture including, but not limited to, floors, walls, countertops, etc.

The sheet 400 clings to the surface of the item 402 and allows a person to visualize what the item would look like with a particular finish applied. The different finishes available are represented by the color patterns 404. The depicted embodiment illustrates four different color patterns, however, any number of color patterns 404 may be included on the sheet 400. In another embodiment, multiple sheets 400, each having a set of unique color patterns 404 may be attached to the item 402 to give a wide range of visualizations to the person.

Figure 5:
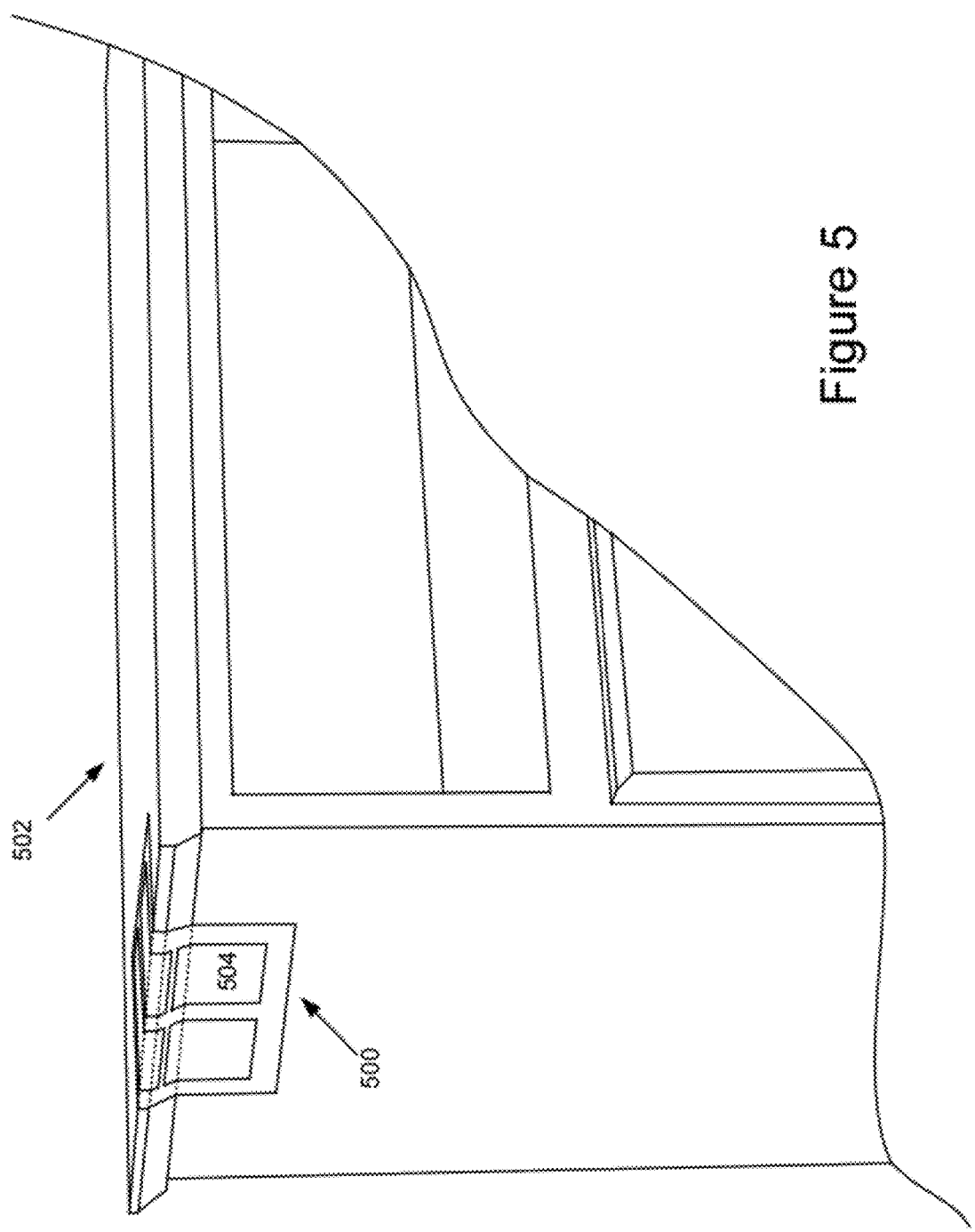
FIG. 5 is a perspective view diagram of a sheet conforming to a profile of an item.

FIG. 5 is a perspective view diagram of a sheet 500 conforming to a profile of an item. In one embodiment, the sheet 500 is formed of a supple and pliable vinyl material as described above with reference to FIG. 1. As such, the sheet 500 is capable of conforming to the profile of an object 502. In this embodiment, the object 502 is a piece of furniture similar to that of FIG. 4. In other words, the pliable and supple features of the sheet 500 allow a person to "bend" the color pattern around an edge of the object 502, thereby giving the person a better idea or visualization of what the object will look like with a particular finish applied. This visualization is possible because of the translucent sheet 500 and semi-translucent color patterns 504. Stated differently, a person is able to visualize what the object 502 will look like because the person can see the surface of the object 502 through the sheet 500 and the color pattern 504.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
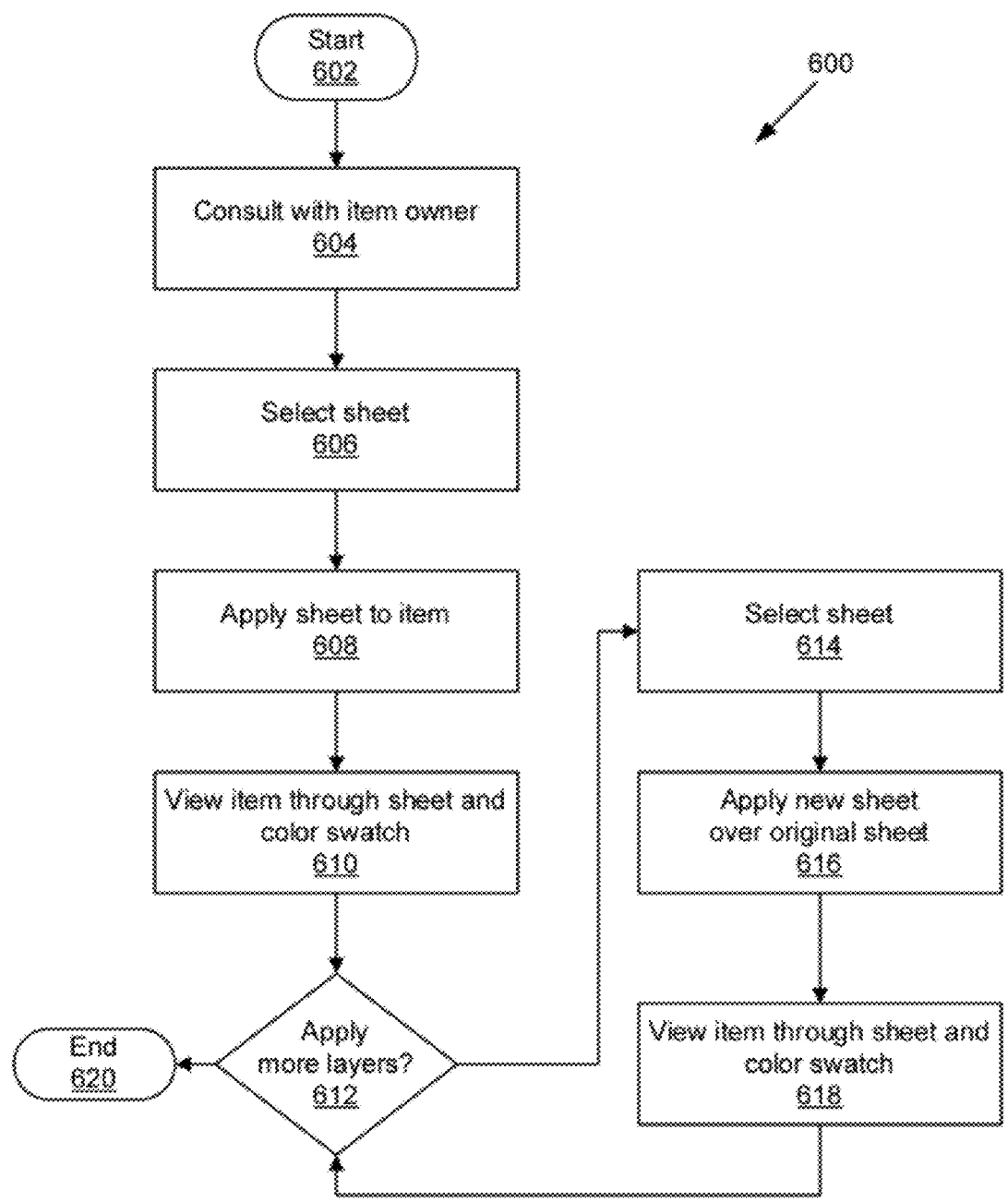
FIG. 6 is a schematic flow chart diagram illustrating one embodiment of a method for presenting color patterns to customers.

FIG. 6 is a schematic flow chart diagram illustrating one embodiment of a method 600 for presenting color patterns to customers. The method starts 602 and a color professional consults 604 with the customer or owner of the item. The item, as described above, may be a piece of furniture, floor, wall, countertop, etc. The color professional selects 606 at least one sheet to present to the customer according to the present state of finish of the item. For example, the item may be unfinished, or alternatively, the item may be an antique with a faded finish. The sheets can be provided with color patterns according to the item to which the finish will be applied. In other words, in one embodiment a sheet has color patterns for unfinished furniture and another sheet has color patterns for furniture having a cherry finish, or a maple finish, etc.

The color professional applies 608 or attaches the sheet to the item, conforming the sheet to the surface of the item as described above with reference to FIG. 5. The color professional and or the customer then views 610 the item through the sheet and the color pattern 610. The customer or the color professional may then decide 612 if another layer of color pattern from another sheet is desirable.

One benefit of the present disclosure is the capability of simulating multiple coats of finish. If a customer desires a darker oak finish, for example, another sheet having oak finish color patterns can be applied over the top of the first sheet. Returning to the method 600, if the customer wants to apply another layer, the customer and or the color professional selects 614 another sheet, applies 616 the new sheet over the original or first sheet, and views 618 the item through the sheet and color pattern. Once the customer is satisfied and has selected a finish, or a combination of finishes represented by the color patterns, the method 600 ends 620.

Figure 7:
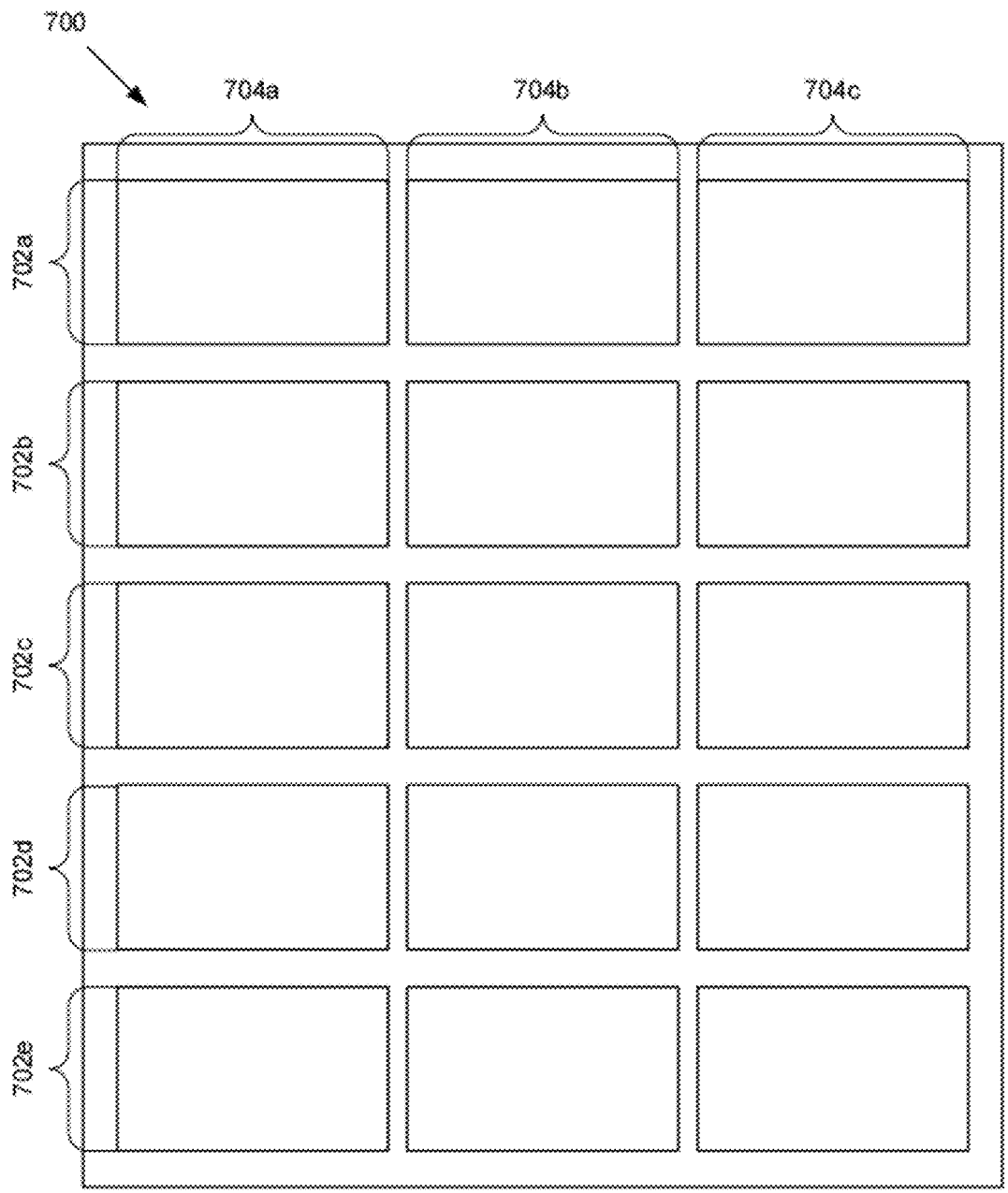
FIG. 7 is a schematic block diagram illustrating another embodiment of a sheet.

FIG. 7 is a schematic block diagram illustrating another embodiment of a sheet 700. In the depicted embodiment, the sheet 700 includes rows 702a, 702b, 702c, 702d, 702e (referred to collectively as rows 702) and columns 704a, 704b, 704c (referred to collectively as columns 704) of color patterns. The color patterns may be arranged so that each row contains a single color, and variations of that color. The variations include, but are not limited to, increasing color intensity, different sheen finishes, and different application techniques.

For example, the sheet 700 might include a row 702a depicting a stain finish called burnt sienna. The first column 704a of row 702a, in one embodiment, would comprise a color pattern depicting the application of one coat of burnt sienna wood stain. Column 704b, therefore, would be a variation of that color, and for example, might depict the application of four coats of burnt sienna wood stain. Likewise, column 704c might depict 8 applications of the wood stain. The numbers of coats given above are for example only, as other variations may be implemented.

In another embodiment, the variation shown on the sheet comprises color patterns that depict the color with a high-gloss, semi-gloss, satin, or matte finish. Alternatively, the sheet might depict different application techniques such as spraying on the finish, or hand pulling the finish. Furthermore, multiple sheets each showing the above described variations may be provided so that a person is able to visualize the many different options. This will be described below in greater detail with reference to FIG. 8.

Figure 8:
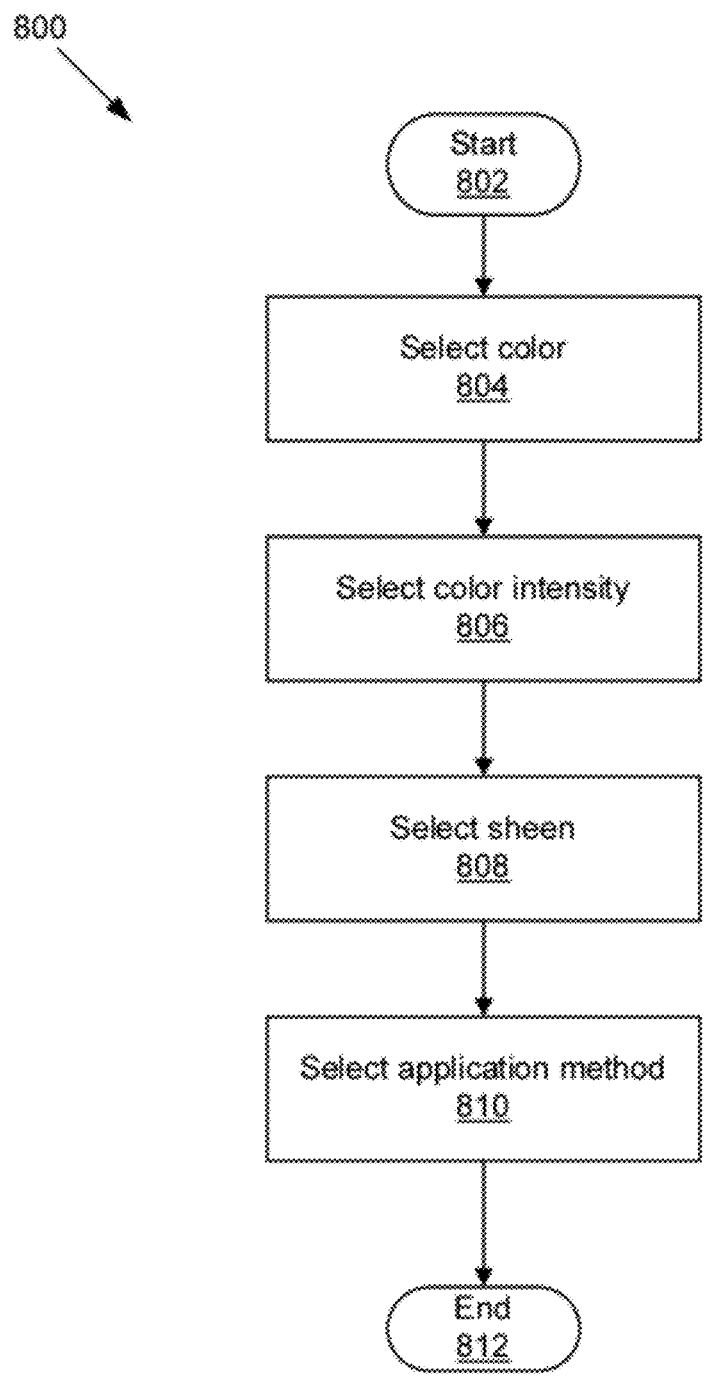
FIG. 8 is a schematic block diagram that illustrates a method of selecting a color, color intensity, sheen, and application style.

FIG. 8 is a schematic block diagram that illustrates a method of selecting a color, color intensity, sheen, and application style. The method 800 starts 802 and a color sheet having various different colors is attached to an item so a person may select 804 a color. The color sheet may be the sheet 100 of FIG. 1, sheet 700 of FIG. 7, or alternatively, a sheet having a single color pattern. For example, the color sheet may only comprise a single enlarged color pattern that fills the entire sheet. In a further embodiment, the sheet may be formed of a colored plastic. In other words, instead of a translucent color sheet having color patterns printed on, the color sheet may be formed of a plastic material formulated to produce the desired color and opacity of the color patterns described above.

Upon selecting a color, a new sheet is provided that depicts the selected color with varying color intensities. A person is able to select 806 a color intensity by comparing the color intensities on the color intensity sheet. As described above, the color intensity, in one embodiment, is the number of coats of finish that can be applied to an item. For example, one, four, or eight coats of finish.

The person then selects 808 the sheen of the finish. A new sheen sheet is provided with the selected color and color intensity. In one example, the sheen sheet comprises four columns of color patterns. The first column depicts the selected color and color intensity having a matte finish, the second column shows a satin finish, the third column shows a semi-gloss finish, and the fourth column shows a high-gloss finish, for example. Alternatively, individual sheets with the different sheens are provided.

The person then selects 810 the application method. An application method sheet is provided with different application techniques illustrated to give the person an idea of what the selected color, color intensity, and sheen will look like when applied by hand or by sprayer, for example. Similarly, the application method may include different samples depicting the available options, or individual sheets may be provided. The method 800 then ends 812.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method to select a finish, the method comprising:
   providing a plurality of flexible translucent sheets each having a plurality of semi-translucent color patterns, where each of the plurality of semi-translucent color patterns comprises a pattern representative of wood grain that does not include a depiction of a substrate, wherein the plurality of translucent sheets are removably attachable to a surface of an item, and wherein each of the plurality of translucent sheets is formed of a static cling vinyl film;
   providing a protective laminate surface coupled to the flexible translucent sheet, where the protective laminate surface comprises a static cling vinyl film, such that the plurality of semi-translucent color patterns are disposed between the flexible translucent sheet and the protective laminate surface before affixing the flexible translucent sheet to the surface;
   examining the item to determine the type of finish of the item;
   selecting a first sheet from the plurality of flexible translucent sheets according to the finish of the item;
   conforming and affixing the first translucent sheet to the surface of the item;
   viewing the surface of the item through the first translucent sheet;
   selecting a second sheet from the plurality of flexible translucent sheets and affixing the second sheet over the first sheet and aligning at least one of the semi-translucent color patterns of the second sheet with at least one of the semi-translucent color patterns of the first sheet;
   viewing the surface of the item through the first translucent sheet and the second translucent sheet;
   selecting a combination of semi-translucent color patterns in response to the aligning of the first sheet with the second sheet; and
   removing the first sheet and the second sheet from the surface of the item.

2. The method of claim 1, further comprising providing a plurality of color patterns, each of the plurality of color patterns representative of a unique finish, and where each of the plurality of color patterns do not include a depiction of the surface.

* * * * *